Dec. 6, 1955     W. F. FRENCH     2,725,690
CUTTER GRINDING MANDREL WITH TOOTH REST
Filed July 22, 1954
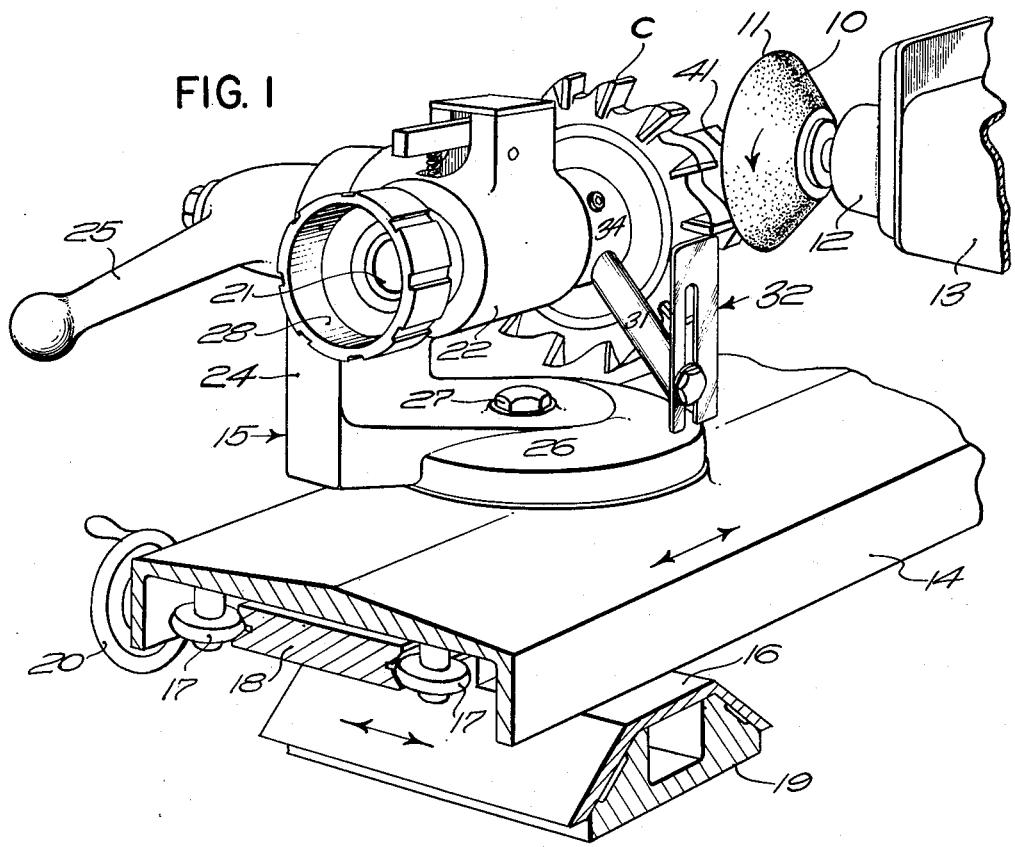
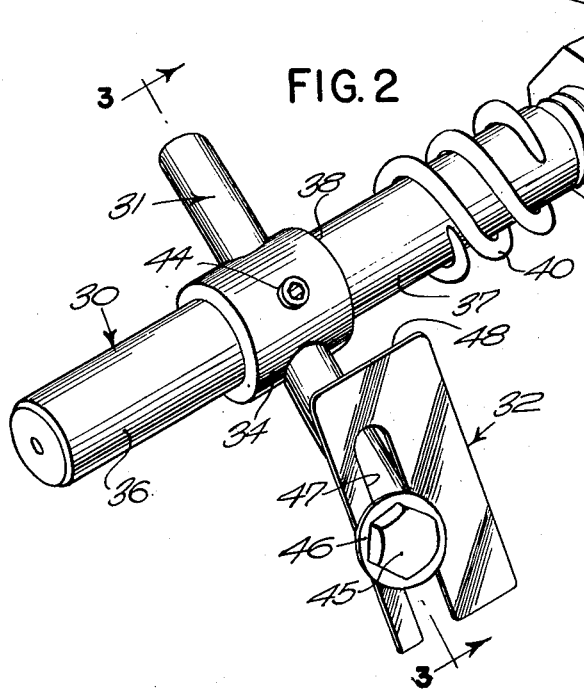
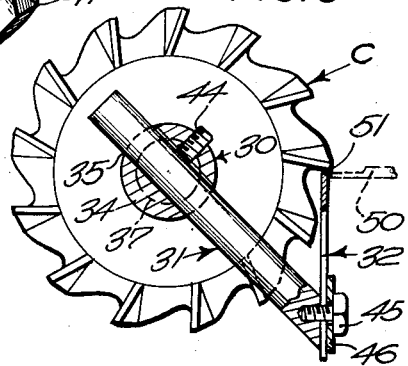
WARREN F. FRENCH
INVENTOR
BY W Russell Greenwood
ATTORNEY United States Patent Office 2,725,690
Patented Dec. 6, 1955

2,725,690

CUTTER GRINDING MANDREL WITH TOOTH REST

Warren F. French, Brockton, Mass., assignor, by mesne assignments, to William H. Field Co., Inc., Boston, Mass., a corporation of Massachusetts Application July 22, 1954, Serial No. 445,003

9 Claims. (Cl. 51—122)

This invention relates to cutter grinding and sharpening machines and, in particular, to a novel grinding mandrel with tooth rest for supporting circular toothed cutting tools during the grinding or sharpening thereof whereby such cutters may be correctly ground and sharpened with a minimum of set-up time in the grinding machine. More especially, the invention has to do with the grinding and sharpening of circular cutters of various types such as, for example, plain mills, straddle mills, side mills, and other similar forms of rotary cutting tools, and contemplates supporting means for a cutter of the above-mentioned types to be ground or sharpened combined with an adjustable tooth rest for positioning under the cutter tooth being sharpened whereby each tooth of the cutter will be supported in succession by the tooth rest and held in such fixed position with relation to the centerline of the cutter and the centerline of the grinding wheel that all the cutter teeth will be ground accurately and precisely concentric with the bore of the cutter, and with the proper clearance angles, bevel angles and land during the sharpening of the cutter by a grinding wheel of either the ordinary cylindrical type or by one of cup shape. With this device the cutter being ground rotates on its own axis around the mandrel during manual indexing of the cutter from one tooth to the next and the placing of the tooth rest under the tooth being ground to set it horizontal insures that all of the teeth will be ground exactly the same distance from the center of rotation of the cutter.

The invention has for one of its objects to provide novel means for setting the tooth rest relative to the tooth to be sharpened independently of the height adjustment which determines the clearance angle, and which can be done either in or out of the grinding machine and, in the latter instance, in the hand of the operator thereby eliminating the objectionable or necessary prior art practice of making the adjustment of tooth rest position, tooth angle, and height setting or clearance angle all together on the grinding machine.

Another object of the invention is to provide a device for mounting a cutter during grinding which will have means adjustable in two directions thereof and cooperating with the teeth of the cutter for positioning and centering each tooth being ground with the axis of the bore of the cutter whereby the cutter teeth may be consecutively ground with the correct tooth angle and with substantially perfect concentricity of rotation of the cutting edges of the cutter.

Another object of the invention is to provide an improved grinding mandrel with tooth rest which is readily adapted for use in grinding circular cutters of various diameters, and including a tooth rest blade member which will provide a steady support for the tooth being ground and can be adjusted and set to regulate the tooth angle (radial or rake face) at which the cutter is to be ground independently of the clearance angle setting.

In the accompanying drawings which illustrate one form of the invention,

Fig. 1 is a pictorial view of the work head, reciprocable carriage, and traverse slide of a cutter grinder showing my improved cutter grinding mandrel with tooth rest installed in the work head and a circular cutter mounted on the mandrel and arranged in operative position preparatory to grinding of the circumferential cutting edges of the cutter teeth by a flared cup shape grinding wheel, the grinding wheel being here shown out of grinding contact with the cutting edge of an individual cutter tooth supported by the tooth rest for the purpose of providing a clear unobstructed view of the tooth rest set up under the tooth to be ground;

Fig. 2 is an enlarged perspective view of the combined mandrel and tooth rest device of my invention as shown in Fig. 1 but without the circular cutter to be ground; and Fig. 3 is a vertical sectional view taken approximately on the line 3—3 of Fig. 2 looking in the direction of the arrows, showing a circular cutter mounted on the mandrel of my device with the tooth rest blade thereof placed under and supporting a cutter tooth to be ground, and illustrating the manner in which a centering gage is employed to effect alignment of the tooth to be ground in the same horizontal plane with the centerline of the cutter and the centerline of the grinding wheel spindle.

Referring first to Figure 1, it will be observed that I have there illustrated the following structural parts and members of a known construction of cutter or router bit grinder with which the combined cutter grinding mandrel and tooth rest device of the present invention is to be used in which: A grinding wheel 10 here shown as being of flared cup shape having a transverse annular cutting face 11 is secured at one end of a power driven spindle 12 which is suitably journaled in a suitable head member 13. Other types of grinding wheels generally used on cutter and tool grinding machines may be employed, if desired. The grinding wheel head 13 may, if desired, form a part of or be mounted on the grinding machine in a position to dispose the grinding wheel 10 above a carriage 14 on which is carried an indexing work head 15. The carriage 14 is arranged for longitudinal reciprocation to-and-fro upon a transverse slide 16 by means of free-moving, anti-friction rollers 17 and a V-edged plate member 18 which extends longitudinally beneath the carriage 14 and is mounted in a cross-wise relation upon the slide 16. The carriage 14 is hand-propelled past the face of the grinding wheel 10 in a direction at right angles to the axis of the grinding wheel spindle 12 during grinding of a cutter and returned to its initial position for indexing of the cutter to place the next succeeding tooth upon the rest blade for grinding. The transverse slide 16, in turn, is operatively arranged for sliding movement back and forth on a guide member 19 by means of a suitable feed screw (not shown) turned by an operating handle 20. The work head 15 carries a conventional non-rotating work supporting collet 21 movable longitudinally in a suitable bearing sleeve (not shown) which is housed within the bore of a hub member 22. The hub 22 is pivoted in the upper part of an upright arm 24 of the work head 15, and has angular adjustment in a vertical plane by means of operating lever 25, and may be adjusted angularly in a horizontal plane by rotary movement of the work head base 26 about a vertical axis here shown as the central mounting stud 27 which secures the work head to the carriage 14. An enlarged hand-operated clamping nut 28 having suitable threaded connection with the usual threaded shank of the collet 21 operates to draw it longitudinally with respect to its supporting bearing sleeve to effect clamping of the work arbor or mandrel by the collet 21.

Referring now to Figs. 2 and 3, the particular form of the invention as there shown is a cutter grinding mandrel with tooth rest which is made up of three main structural elements, namely, a mandrel 30 for mounting and rotatably supporting a circular cutter to be ground or sharpened; an extensible bar member 31 carried by the mandrel 30 and projecting radially thereof for supporting at its projecting end a tooth rest at correctly adjusted positions from the mandrel to place the tooth rest under one of the cutter teeth when grinding different sizes of circular cutters; and a flexible tooth rest blade 32 which is carried by and angularly disposed to the bar member 31 at its outwardly extended end and laterally adjustable thereto for engaging under an individual cutter tooth to support it during grinding.

The mandrel 30 is here shown as being in the form of an elongated metal body having an enlarged intermediate cylindrical portion 34 provided with a diametrically disposed bore 35 therethrough (see Fig. 3) and having disposed on either side of the enlarged cylindrical portion 34 and extending axially in opposite directions therefrom two cylindrical stub shaft portions 36 and 37 of unequal length and each of smaller diameter than the portion 34. The shorter shaft portion 36 forms the attaching stem of the mandrel 30 and is inserted within and clampingly held by the collet 21 of the work head 15 during grinding of a circular cutter. The circular cutter C to be ground (see Figs. 1 and 3) is rotatably mounted upon the longer shaft portion 37 (see Figs. 1 and 3) with one of its radial side faces held firmly against the shoulder-forming end 38 of the enlarged portion 34 by a compression type spring 40. The spring 40 acts between the adjacent radial side face of the cutter C and a clamping nut 41 which is threaded onto the threaded end portion 42 of the shaft 37 and is adjusted to effect sufficient compression of the spring 40 to restrain the cutter C from freely rotating on the shaft 37 yet will permit it to be readily indexed from one tooth to the next in the grinding of the cutter teeth.

The bar member 31 is carried by the enlarged cylindrical portion 34 of the mandrel and passes entirely through the bore 35 thereof, the bar having a sliding fit therein and being of sufficient length so that it may be adjusted radially into various laterally extended positions with respect to said portion 34 at right angles to the axis of the mandrel. A set screw 44 secures the bar member in its adjusted position to the mandrel. The flexible tooth rest element 32 consists of a blade made of flat sheet spring stock and is attached by a stud 45 and a washer 46 to the end extremity of the bar member 31 distal from the mandrel 30. This end of the bar member is beveled at approximately 45° so that the tooth rest blade 32 fastened thereto also is inclined angularly at that angle to the axis of the bar member. The tooth rest blade 32 is slotted as at 47 and the stud 45 passes therethrough and has threaded connection to the end of the bar member 31. In grinding a cutter C the top edge 48 of the tooth rest blade 32 is placed under the tooth being ground close to but back from its cutting edge. The teeth of the cutter C are ground in succession and a height adjusting or centering gage 50 is used to line up the cutting edge, such as 51, of each tooth to be ground to place it in the same horizontal plane with the centerline of the grinding wheel spindle 12 and the centerline of the cutter C or axis of the mandrel 30.

In the use and operation of the device in the particular embodiment shown, the rotary cutter C to be sharpened first is mounted onto the mandrel shaft portion 37 which is positioned within the bore of the cutter and the cutter then slid therealong until its inner radial side bears against the annular shoulder 38 of the mandrel portion 30. The helical spring 40 next is slipped onto the shaft portion 37 followed by the nut 41 which is tightened enough to put the spring 40 under sufficient compression to hold the cutter C in this position firmly against the shoulder 38. The spring 40 prevents the nut 41 from turning on the mandrel when the cutter C is rotated during indexing thereon and it also keeps the cutter C square with the cyindrical face of its supporting shaft portion 37.

Set screw 44 and stud 45 now are loosened by the operator and the bar member 31 adjusted radially and the upper edge 48 of the tooth rest blade 32 simultaneously brought into contact with the underface of one of the teeth of the cutter C, it being placed about 1/16 of an inch back from the transverse cutting edge thereof, as indicated at 51 in Fig. 3. This set-up is true whether the cutter tooth is a radial or a rake tooth. The described relationship is accomplished by the joint operations of slidably adjusting the loosened tooth rest blade 32 crosswise on the end of the bar member 31 while at the same time radially adjusting the extended length of the bar member 31 to the mandrel by appropriate longitudinal sliding movement in the bore 35 of the mandrel portion 34 so that the tooth rest blade 32 will make approximately a right-angle to the underface of the cutter tooth to be ground close to its cutting edge and thus provide a support therefor of sufficient rigidity to prevent the tooth rest blade from springing when pressure is transmitted on it during grinding of the tooth resting thereon.

After the tooth rest blade 32 is adjusted and positioned as just described the set screw 44 and stud 45 are tightened to secure the bar member 31 and the tooth rest blade 32 in their respective adjusted positions. The foregoing procedure applies whether the circular cutters to be ground are of different sizes. The entire mandrel and tooth rest assembly with the cutter C then is installed in the work head 15 by insertion of the stub shaft portion 36 of the mandrel into the head portion of the collet 21 thereby supporting the cutter C and the shaft portion 37 of the mandrel in an overhanging relation above the carriage 14 as depicted in Fig. 1.

The parts are set up for a grinding or sharpening operation by rotatably positioning the mandrel 30 in the collet 21 until the cutting edge such as 51 of the cutter tooth engaging the tooth rest 32 is positioned in a horizontal plane passing through the axis of the grinding wheel 10. This positioning of the cutting edge 51 is accomplished by placing the blade 50 of a centering gage, as shown in Fig. 3, under and in engagement with the underface of the tooth being supported by the tooth rest blade 32. This centering adjustment is in accordance with standardized cutter sharpening practice to position the tooth to be ground at the proper height to develop the desired clearance angle. After these centering adjustments have been made as above-described the mandrel 30 is secured to the collet 21 against rotation in this adjusted position by appropriate tightening movement of the hand-operated clamping nut 28.

The cutter C then is brought into grinding contact with the transverse face 11 of the grinding wheel 10 by appropriate adjustment of the slide 16 by means of the hand wheel 20. Then the cutter C is traversed longitudinally past the grinding wheel 10 by manually pushing the carriage 14 whereby the full extent of the cutting edge 51 of the tooth supported by the tooth rest blade 32 will pass straight across the face of the grinding wheel and be ground. When one tooth has been ground the cutter and the carriage 14 with the work head 15 are moved past the grinding wheel in the opposite direction and returned to their starting position, after which the cutter C is indexed by hand to the next tooth. This sequence of operations is repeated until the cutter has made one complete revolution on the mandrel and all of the cutter teeth have been ground. During indexing of the cutter teeth the tooth rest blade 32 is first flexed outwardly by the next lower tooth as it is moved upwardly and then springs back into position after such tooth has been moved into correct position to be supported by the blade for grinding.

It will be understood by those skilled in the art that my invention may assume varied physical forms without departing from my inventive concept and I, therefore, do not limit myself to the specific embodiment herein chosen for illustration, but only as indicated in the appended claims.

What is claimed is:

1. In a cutter grinding machine of the character described, the combination with a reciprocable carriage, a work head on said carriage, and a rotatable grinding wheel having a transverse cutting face, said carriage with said work head being arranged for movement longitudinally and laterally relative to said grinding wheel, of a mandrel held by said work head and extending longitudinally of said carriage, said mandrel being in the form of an elongated body having coaxial cylindrical end portions of which one is arranged for supporting a cutter to be ground for rotary movement thereon and the other inserted into and secured in the work head, a spring encircling said cutter supporting end portion of the mandrel, means for compressing and clamping said spring against a cutter on said end portion to restrain it from free rotation thereon, a radially extendable member slidably mounted in said mandrel, means for securing said extendable member in various adjusted positions relative to said mandrel, and a spring rest for cutter teeth supported by and adjustably connected with said extendable member and adapted to be engaged under an individual tooth of a cutter carried by said mandrel to support the tooth during grinding thereof.

2. In a cutter grinding machine of the character described, the combination with a reciprocable carriage, a non-rotating work head carried by said carriage, and a rotatable grinding wheel having a transverse cutting face and disposed above said carriage, of a mandrel having a shaft portion at one end supported by and mounted in said work head and a cutter supporting shaft portion at the other end coaxial with the first shaft portion and extending in an overhanging relation above and longitudinally of said carriage, a helical spring on said cutter supporting portion, a nut for compressing and clamping said spring against a cutter to prevent free rotation of the latter on its supporting shaft portion, a bar member carried by said mandrel and arranged to be adjustable radially thereof into various extended positions, and a slotted spring rest for cutter teeth adjustably connected with said bar member and carried by the extended end portion thereof and adapted to be engaged under an individual tooth of a cutter carried by said mandrel portion.

3. A cutter grinding mandrel with tooth rest comprising a mandrel having a pair of coaxial shaft portions extending in opposite directions one of which is adapted for supporting the mandrel in a work holder and the other being adapted for supporting a circular cutter to be ground for rotary movement about its axis, a spring encircling said cutter supporting shaft portion, means for compressing and clamping said spring against a cutter to prevent rotation of the latter on its supporting shaft, an extendable member adjustably supported by said mandrel and disposed radially thereof, and a rest element for cutter teeth mounted on one end of said extendable member and adjustably positioned thereon to be engaged under and by an individual tooth of a circular cutter carried by said mandrel.

4. A cutter grinding mandrel with tooth rest comprising a mandrel having a pair of coaxial shaft portions extending in opposite directions one of which is adapted for supporting the mandrel in a work holder and the other being adapted for supporting a circular cutter to be ground for rotary movement about its axis, a helical spring on said cutter supporting shaft portion, means for compressing and clamping said spring against a cutter to prevent free rotation of the latter on its supporting shaft, an extendable member adjustably supported by said mandrel and disposed radially thereof, and a rest element for cutter teeth mounted on one end of said extendable member and adjustably positioned thereon to be engaged under and by an individual peripheral tooth of a circular cutter carried by said mandrel, said tooth rest element being a flexible spring finger.

5. A cutter grinding mandrel with tooth rest comprising a mandrel in the form of an elongated body having coaxial cylindrical end portions, one end portion being adapted for insertion into a holder and the other end portion being threaded at its outer end and adapted for supporting a circular cutter to be ground, said body having an enlarged intermediate shouldered portion provided with a lateral bore therethrough, a helical spring on said cutter supporting mandrel portion, a nut on said threaded end portion for compressing and clamping said spring against a cutter to prevent free rotation of the latter thereon and to hold the cutter against said shouldered portion, an elongated bar member slidably mounted in said bore and extending therethrough and adapted to be adjusted radially into various extended positions relative to the mandrel, means for securing said bar member in its different radially adjusted positions, and a spring tooth rest blade member affixed at the outermost end extremity of said extended bar member and adapted for engagement under and behind the cutting edge of an individual peripheral tooth of a circular cutter carried by said end portion of the mandrel.

6. A cutter grinding mandrel with tooth rest comprising a mandrel in the form of an elongated body having coaxial cylindrical end portions, one end portion being adapted for insertion into a holder and the other end portion having adapted for supporting a circular cutter to be ground, said body having an enlarged intermediate shouldered portion provided with a lateral bore therethrough, a helical spring on said cutter supporting mandrel portion, a nut for compressing and clamping said spring against a cutter to prevent free rotation of the latter on its supporting mandrel portion and to hold the cutter against said shouldered portion, an elongated bar member slidably mounted in said bore and extending therethrough and adapted to be adjusted radially into various extended positions relative to the mandrel, means for securing said bar member in its different adjusted positions, and a flexible tooth rest blade member provided with a slot, and detachable means passing through said slot and securing said blade member to said bar member.

7. A cutter grinding mandrel with tooth rest comprising a mandrel in the form of an elongated body having coaxial cylindrical end portions, one end portion being adapted for insertion into a holder and the other end portion adapted for supporting a circular cutter to be ground, said body having an enlarged intermediate shouldered portion provided with a lateral bore therethrough, a helical spring on said cutter supporting mandrel portion, a nut for compressing and clamping said spring against a cutter to prevent free rotation of the latter on its supporting mandrel portion and to hold the cutter against said shouldered portion, an elongated bar member slidably mounted in said bore and extending therethrough and adapted to be adjusted radially into various extended positions relative to the mandrel, means for securing said bar member in its different radially adjusted positions, said bar member having a beveled end extremity, and a slotted spring tooth rest blade member adjustably connected with the beveled end of said bar member and being angularly inclined with respect to the longitudinal axis thereof, said blade member being adapted to be positioned under and to engage behind the cutting edge of a peripheral tooth of a circular cutter carried by said mandrel.

8. In a device of the class described, a mandrel comprising two coaxial stub shaft portions extending axially in opposite directions one for insertion in a work holder collet and the other for rotatably supporting a circular cutter to be ground, said mandrel having intermediate its ends an enlarged shouldered part formed with a laterally extending bore therethrough, a helical spring on said cutter supporting shaft portion, a nut for compressing and clamping said spring against a cutter to prevent free rotation of the latter on its supporting shaft portion and to hold the cutter against said shouldered part, a bar member slidably mounted in said bore and of a length to project radially well beyond said enlargement of the mandrel and to be extended into various adjusted positions thereto, fastening means for fixedly securing said bar in any of its radially adjusted positions, a flexible sheet metal tooth rest blade member slotted longitudinally thereof and adjustably connected with the extended end portion of said bar member, said blade member extending crosswise thereof in a direction toward the teeth of a circular cutter carried by said mandrel to be engaged under and behind the cutting edge of a peripheral tooth thereof whereby said tooth may be supported with its cutting edge in a fixed angular position with respect to the axis of said mandrel for grinding.

9. A mandrel with tooth rest for cutter grinding purposes comprising a mandrel element in the form of an elongated metal body having a pair of coaxial shaft portions at its opposite ends, one of said shaft portions being adapted for insertion into a work holder and the other of said shaft portions being arranged for supporting for free rotation thereon a circular cutter to be ground, means adjustable on said cutter-supporting shaft portion and engageable with the cutter to restrain the latter from free rotation, a bar member longitudinally disposed at right angles to the axis of said mandrel and slidably mounted therein centrally therethrough for adjustment radially of the mandrel element into various extended positions, means for securing said bar member in its different radially adjusted positions, and an elongated flat spring tooth rest blade member affixed at the outermost end extremity of said extended bar member obliquely thereto in which the body of said blade member lies in a plane which forms an included angle of 45° with a plane containing the longitudinal axes of both the mandrel element and said bar member, the upper edge of said blade member being disposed to be engaged under an individual tooth of a circular cutter carried by said cutter-supporting shaft portion of the mandrel element.

References Cited in the file of this patent

UNITED STATES PATENTS

| | | |
|---|---|---|
| 355,414 | Reinecker | Jan. 4, 1887 |
| 439,154 | Holz | Oct. 28, 1890 |
| 1,352,703 | Tulek | Sept. 14, 1920 |
| 1,626,244 | Lindholm | Apr. 26, 1927 |
| 1,721,309 | Miller | July 16, 1929 |
| 2,349,324 | Wiedmann | May 23, 1944 |